United States Patent [19]

MacLean et al.

[11] 4,337,068
[45] Jun. 29, 1982

[54] METHODS FOR REMOVING ENTRAINED SOLIDS FROM GASES

[75] Inventors: John P. MacLean, Stafford; J. Edward Cantwell, Houston; John D. Brown, The Woodlands; Harold D. Hoy, Bridge City, all of Tex.

[73] Assignee: Texaco Inc., White Plains, N.Y.

[21] Appl. No.: 198,416

[22] Filed: Oct. 20, 1980

Related U.S. Application Data

[63] Continuation-in-part of Ser. No. 38,755, May 14, 1979, abandoned, which is a continuation-in-part of Ser. No. 865,051, Dec. 27, 1977, abandoned.

[51] Int. Cl.³ ............................................. B01D 45/16
[52] U.S. Cl. ...................................... 55/1; 55/459 R; 209/144
[58] Field of Search ............. 55/1, 459 R; 210/512 R, 210/512 M; 209/144

[56] References Cited

U.S. PATENT DOCUMENTS

| | | | |
|---|---|---|---|
| 3,545,735 | 12/1970 | Wolf et al. | 55/459 R |
| 3,636,682 | 1/1972 | Rosh | 55/459 R |
| 3,802,570 | 4/1974 | Dehne | 55/459 R |
| 3,817,872 | 6/1974 | Guans et al. | 55/459 R |
| 3,850,816 | 11/1974 | Koch | 210/512 R |

OTHER PUBLICATIONS

Perry, Chemical Engineer's Handbook, 4th Ed., 1969, pp. 20-69 to 20-74.

Primary Examiner—Gregory N. Clements
Attorney, Agent, or Firm—Carl G. Ries; Robert A. Kulason; Theron H. Nichols

[57] ABSTRACT

A method for the removal of entrained solids from gases in a cyclone separator having a dipleg attached to the bottom thereof comprises the basic steps of, (1) injecting the gases with the entrained solids in an inlet (54) of cyclone separator in the range of substantially 52 feet per second (16 m/s) to 80 feet per second (24 m/s), (2) spinning the injected gases with the entrained solids around and down the cyclone separator to the inlet (70) of the dipleg (34) by a vertical distance (L) below the gas outlet (74) proportional to the diameter (D) of the top of the separator by an amount of L/D=4.49-1.09 (O/I) or about 4, and (3) ejecting the solids-free-gases through a gas outlet (74) in the range of substantially 52 feet per second (16 m/s) to 200 feet per second (61 m/s) having an area (O) in proportion to the area (I) of the separator inlet (54) in the range of substantially O/I=0.4/1 to 1/1, for providing a maximum efficiency with minimum erosion of both the cyclone separator internal wall surface and of the separated solids.

7 Claims, 3 Drawing Figures

METHODS FOR REMOVING ENTRAINED SOLIDS FROM GASES

This application is a continuation-in-part of our prior application Ser. No. 38,755, filed May 14, 1979, abandoned, which is a continuation-in-part of our prior application Ser. No. 865,051, filed Dec. 27, 1977, now abandoned.

BACKGROUND OF THE INVENTION

The present invention relates to gas-solid separation. More particularly, the present invention relates to a method for removal of entrained solids from gases in upright cyclone separators and especially in cyclone separators useful in separating entrained solid catalyst from hydrocarbon vapors or flue gases encountered in the catalytic cracking of hydrocarbon.

This method is used in cyclone separators widely used as dust collectors or gas-solid separators. For example, cyclones are widely used in both the reactor and regenerator sections of Fluidized Catalytic Cracking Units (FCCU) for the removal of entrained catalyst particles from hydrocarbon effluent vapors and flue gases used and/or produced in the cracking process. The construction and operation of cyclone separators is well known to those skilled in the art. Briefly, a cyclone separator has a cylindrical upper portion, commonly called a barrel, adjoined to a lower conic section, the lower, smaller diameter end of the conic section forming a solids outlet. Gas enters the barrel portion, tangentially, at one or more points, and exits through a centrally disposed gas outlet extending through the top wall of the barrel. The dust, e.g. catalyst particles, by virtue of their inertia, tend to move toward the outside walls of the separator and eventually leave through the solids outlet. Essentially, a cyclone separator is a settling chamber in which gravitational acceleration is replaced by centrifugal acceleration. Under common operating conditions, it is not unusual for the centrifugal separating force or acceleration to be several hundred times gravitational force. The higher forces imparted to the dust or solid particles results in a highly erosive effect on the internal walls of the cyclone thereby resulting in rapid wearing. Likewise, a too high of velocity of the catalyst particles causes excessive grinding up of the catalyst to dust, resulting in loss of catalyst. Cyclone separators of the type under consideration are commonly used as last stage dust collectors, as for example, to remove remaining dust and solid particles from gases such as flue gases prior to atmospheric venting. Because of increasing concern for the environment, it is necessary that such cyclone separators, when they are used as last stage solids removing devices, be as efficient as possible in order that the gas vented to the atmosphere will be as pollution free as possible.

SUMMARY OF THE INVENTION

It is therefore an object of the present invention to provide a new and improved method for removal of entrained solids from gases in an upright cyclone separator.

A further object of the present invention is to provide a new method for removal of entrained solids from gases with increased separation efficiency.

Still a further object of the present invention is to provide an improved method for removal of entrained solids from gases whereby erosion of the internal walls by impinging solids is substantially reduced.

Still another object of the present invention is to provide an improved method for removal of entrained solids from gases in a cyclone separator particularly useful as a last stage solids collection device that provides maximum efficiency with minimum erosion of both the cyclone separator internal wall surfaces and of the separated solids.

The above and other objects of the present invention will become apparent from the drawing, the description given herein and the appended claims.

The present invention relies on the unexpected finding that by controlling certain geometrical parameters in the design, construction, and use of cyclone separators, the latter can be made much more efficient, wearing of the internal surfaces due to erosion can be greatly reduced, and erosion of the catalyst or solids is reduced. The cyclone separator used in the new method for removal of entrained solids from gases of the present invention comprises an upper, generally cylindrical barrel portion having a top wall, and a lower, generally conic portion having a solids outlet at the smaller diameter, lower end thereof. The lower, open end of the barrel portion and the conic portion, at its larger diameter end, are adjoined and together define a separation chamber. A generally cylindrical, solids discharge dipleg conduit has an upper end in open communication with the solids outlet whereby disentrained solids can be removed from the separator. The usually rectangular, cross-sectional area "I" of the gas inlet 54 is designed to provide a gas inlet velocity of about 80 ft/sec (24 m/s) and the cross-sectional area "O" of the gas outlet 74 in gas outlet tube 35 is designed to provide a gas outlet velocity of substantially 178 ft/sec (54 m/s). The ratio O/I is maintained in the range of from about 0.4/1 to about 1/1. The ratio of the distance, "L", between the lower end of the gas outlet tube 74 and the solids outlet 70 or upper end of the dipleg conduit, to the internal diameter "D" of the barrel portion of the separator is substantially expressed by the equation:

$$L/D = 4.49 - 1.09 \, (O/I)$$

Most preferably, the cyclone is designed such that the ratio L/D is about 4.0.

In a preferred method for removal of entrained solids from gases, the cyclone separator used is provided with a dust bowl which provides communication between the upper end of the dipleg conduit and the solids outlet formed in the lower end of the conic portion of the separator. It has been found that a method using the disclosed cyclone separator, designed in accordance with the above parameters, functions most effectively in removing solids, e.g. catalyst particulates from gas streams such as hydrocarbons or flue gases, particularly those used in an FCCU.

DESCRIPTION OF THE METHODS

Figure 1:
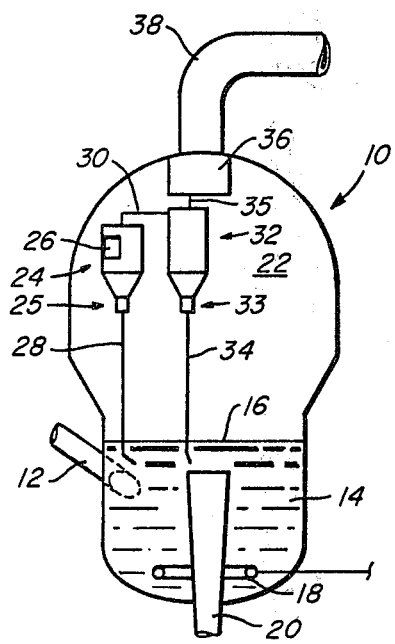
FIG. 1 is an elevational view showing schematically, a typical arrangement of a regenerator used in an FCCU and incorporating the cyclone separators used in the present invention.

This invention comprises a few methods for removal of entrained solids from gases in a cyclone separator.

METHODS FOR REMOVING ENTRAINED SOLIDS FROM GASES

A few methods are set forth for removing entrained solids from gases in an upright cylindrical cyclone separator (32, FIGS. 1-3), for example, having a dipleg (34) attached to the bottom thereof comprising the steps of, (1) injecting the gases with entrained solids in an inlet (54) of the cyclone separator in the range of substantially 52 feet per second to 80 feet per second, (2) injecting the solids-free-gases through a gas outlet (74) in the range of substantially 52 feet per second (16 m/s) to 200 feet per second (62 m/s), the outlet having a cross-sectional area (O) in proportion to the cross-sectional area (I) of the separator inlet (54) in the range of substantially $O/I = 0.4/1$ to $1/1$, and (3) spinning the injected gases with the entrained solids around and down the cyclone separator to the inlet (70) of the dipleg (34) by a vertical distance (L) below the gas outlet (74) proportional to the diameter (D) of the top of the separator by an amount of $L/D = 4.49 - 1.09 \, (O/I)$ for providing a maximum efficiency with minimum erosion of both the cyclone separator internal wall surface and of the separated solids.

Method step (1) of the above basic method may be expanded as follows:

(1) injecting the gases with the entrained solids into the cyclone separator inlet (54) at a velocity of substantially 80 feet per second.

Method step (2) of the above basic method also may be recited in greater detail as follows:

(1) injecting the solids-free-gases into a gas outlet (74) in the upper portion of the separator housing shaped for receiving the solids-free-gas at a velocity of substantially 178 feet per second (54 m/s) for providing maximum efficiency with minimum erosion of both the cyclone separator internal wall surface and of the separated solids.

Method step (2) of the above basic method may also be recited as follows:

(1) injecting the solids-free-gases through the gas outlet having an area (O) in proportion to the separator inlet area (I) in the range of substantially $O/I = 0.45/1$ to $0.6/1$ for providing maximum efficiency with minimum erosion of both the cyclone separator internal wall surface and of the separated solids.

Method step (3) of the above basic method for removal of entrained solids in gases may comprise:

(1) spinning the injected gases with the entrained solids around and down the cyclone separator to the dipleg inlet having a diameter substantially in the range of 0.05 D to 0.2 D for providing maximum efficiency with minimum erosion of both the cyclone separator internal wall surface and of the separated solids.

Method step (3) of the above basic method may be expanded further as:

(1) spinning the injected gases with the entrained solids around and down the cyclone separator to the dipleg inlet by a distance (L) below the gas outlet proportional to the separator maximum diameter (D) by an amount of substantially $L/D = 4$ for providing maximum efficiency with a minimum of erosion of both the cyclone separator internal wall surface and of the separated solids.

The second method step of the above basic method may be expanded as follows:

(1) injecting the solids-free-gases through a gas outlet at substantially 178 feet per second (54 m/s) for providing a maximum efficiency with minimum erosion of both the cyclone separator internal wall surface and of the separated solids.

DESCRIPTION OF THE PREFERRED EMBODIMENTS

While the inventive method has been described with particular reference to the use of cyclone separators in removing entrained catalyst particles from combustion gases leaving a regenerator used in an FCCU, it is to be understood that the methods disclosed and claimed herein find utility in any system wherein a cyclone separator can be used in the new method to separate entrained solids from gaseous streams.

Figure 3:
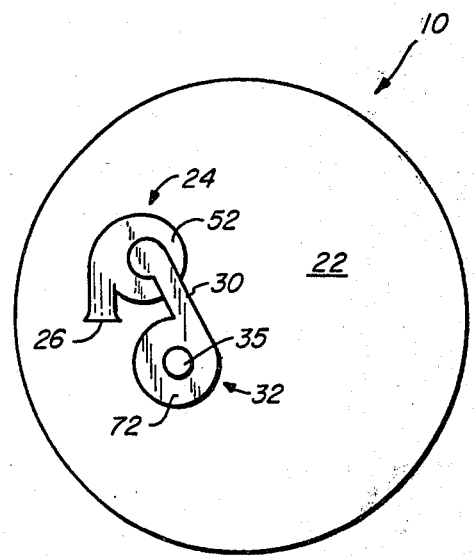
FIG. 3 is a view, partially reduced in size, taken along the lines 3—3 of FIG. 2.
Figure 2:
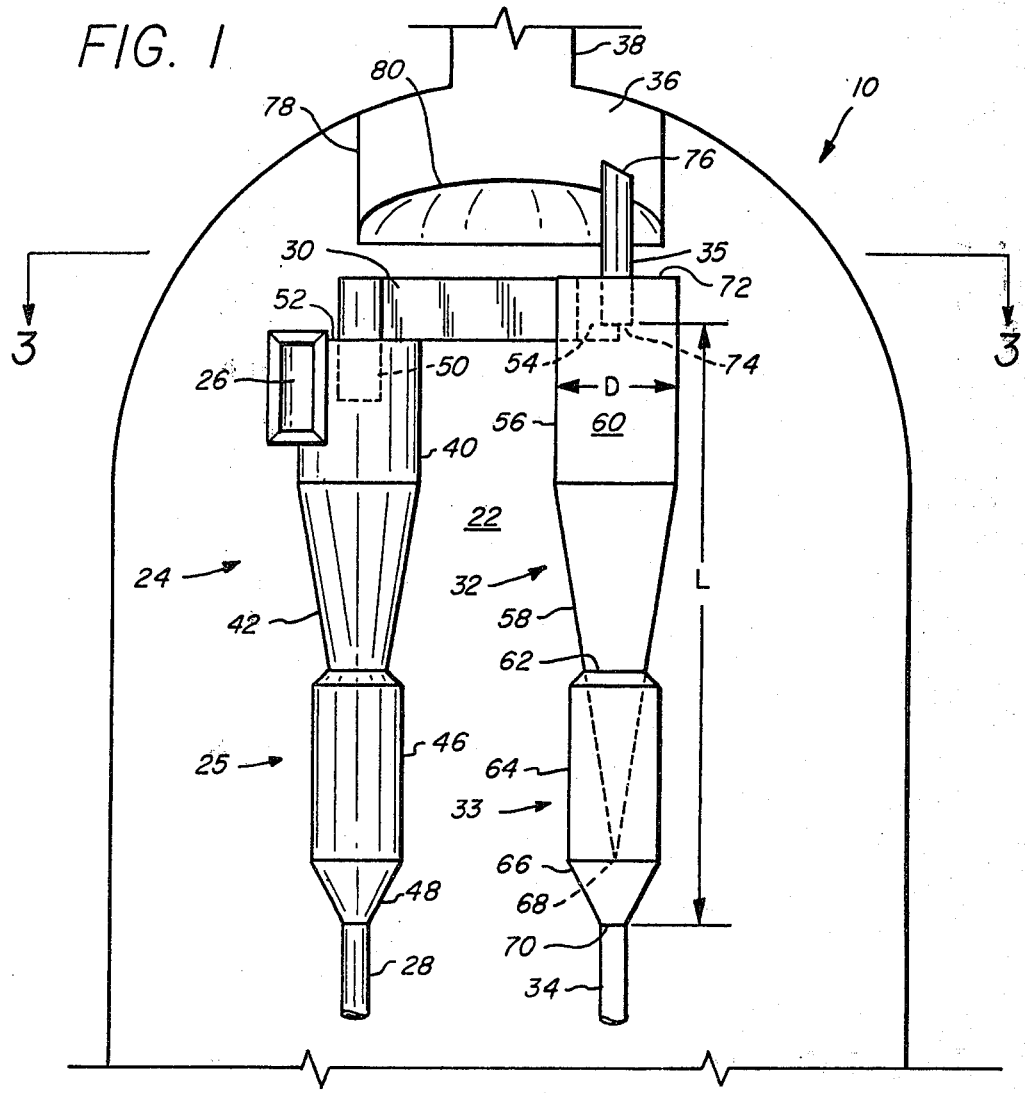
FIG. 2 is a partial, elevational view, similar to FIG. 1, but showing in greater detail the unique construction of the cyclone separators used in the present invention.

The use of a typical cyclone separator as a means of removing solids from entrained gases in a regeneration scheme is shown in U.S. Pat. No. 3,394,076, incorporated herein by reference. The regenerator system shown in FIG. 1 is substantially the same as that shown in the cited patent. Referring then to FIG. 1, the regenerator, shown generally as 10, FIGS. 1-3, is provided with an inlet conduit 12, FIG. 1, through which is fed spent catalyst from a suitable FCCU reactor (not shown). A dense phase bed 14 having an upper level 16 is maintained in regenerator 10. An oxygen containing gas, for example, air, is introduced into regenerator 10 through a suitable air ring 18. Coke or other carbonaceous material coated on the catalyst particles in regenerator 10 is burned away by the oxygen in the regeneration gases.

Regenerated catalyst is withdrawn from regenerator 10, FIG. 1, through draw-off standpipe 20 and returned for further usage in the reactor section of the FCCU. Combustion gases leaving the dense phase bed at level 16 and entrained catalyst particles pass into the disengaging space 22 in the upper portion of the regenerator 10. The gases pass through a first stage cyclone separator 24 via inlet 26. Solids disengaged in separator 24 are returned to bed 14 in regenerator 10 via dipleg 28. The gases leave cyclone separator 24 via transfer line 30 and enter second or last stage separator 32. Gas outlet tube 50, FIG. 1, extends up through top wall 52 of the first stage cyclone separator 24 to the transfer line 30 for supplying gas to the second stage cyclone separator 32. Solids disengaged in separator 32 are returned to the catalyst bed via dipleg 34 while the substantially solids-free gas passes from separator 32 via gas discharge conduit or outlet tube 35 into plenum 36, FIG. 2, located in the upper portion of regenerator 10. The gases in plenum 36 are vented or otherwise removed from regenerator 10 via line 38.

FIG. 2 shows in detail, the system depicted schematicaly in FIG. 1. First and second stage cyclone separators 24 and 32, respectively, are disposed in regenerator 10 by means of suitable bracing and supports (not shown). First stage cyclone separator 24 has an upper cylindrical barrel portion 40 having a top wall 52, the lower end of barrel portion 40 being open. Adjoined to the lower, open end of barrel portion 40 is the upper open, greater diameter end of lower conical portion 42.

Barrel portion 40, conical portion 42 and dust bowl 25 (described hereinafter) cooperatively define an internal separation chamber. Adjoined to the lower end of conical portion 42 is a dust bowl, 25, which dust bowl comprises an upper cylindrical barrel section 46 and a lower conical section 48. Conical section 48 terminates at its lower end in a solids outlet which is connected to the upper end of dipleg 28. The gas inlet 26, which is generally rectangular in cross-sectional shape, provides a means for introducing a gas stream tangentially into the barrel portion 40 of second stage cyclone separator 24. All elements or parts of each separator are preferably welded together.

Gas outlet tube 50 of the first stage separator 24 communicates with gas transfer conduit 30 which in turn is in open communication with a rectangular gas inlet 54 in second stage separator 32 for supplying gas thereto. Second stage separator 32 has an upper cylindrical barrel portion 56 with a top wall 72 and an open, lower end connected to an upper open end of a lower conical portion 58. The barrel portion 56, conical portion 58, and a dust bowl 33 (described hereinafter) define a separation chamber 60 of the second and last stage cyclone separator 32. Conical section 58, at its lower end, defines a circular solids intrance 62 which is in open communication with dust bowl 33. Dust bowl entrance 62 has a diameter relative to the cyclone separator top diameter D in the range of substantially 0.1 D to 0.8 D for providing maximum efficiency with a minimum of erosion of both the cyclone separator internal wall surface and of the separated solids. Dust bowl 33, like dust bowl 25, is comprised basically of an upper cylindrical barrel section 64 and a lower conic section 66, the junction of barrel section 64 and conical section 66 lying in a plane which passes substantially through the apex, shown as 68, of the projection (shown in phantom lines) of the conical portion 58 of last stage separator 32. The lower conical section 66 of dust bowl 33 is in open communication with the solids outlet or dipleg inlet 70 or the upper end of cylindrical dipleg 34.

Gas outlet tube 35 extends through the top wall 72 of cylindrical barrel portion 56, gas outlet tube 35 having a lower end or gas outlet 74 in separation chamber 60 where the gases pass out through gas outlet tube 35 to exit from upper open end 76 into plenum 36. Plenum 36 is defined by a portion of the upper wall of regenerator 10 with gas vent line 38 therein, a cylindrical wall 78 affixed to the upper wall portion of regenerator 10, and a domed shaped bottom wall 80, affixed at its periphery to the lower end of cylindrical wall 78.

In operation of the disclosed cyclone separator, gas from disengaging space 22 enters rectangular gas inlet 26 of separator 24 and is introduced tangentially into the barrel portion 40. Solid particles, because of their inertia, move toward the walls of separator 24 and generally spiral downwardly toward dust bowl 25, being ultimately discharged through dipleg 28 into the dense phase in regenerator 10. The gas, at least partially free of solids, passes upwardly through the central gas outlet tube 50 into transfer conduit 30. The gas then enters second stage cyclone 32 via rectangular inlet 54, the gas being introduced tangentially into the part of separation chamber 60 defined by the barrel portion 56 of separator 32. Solids once again move to the walls of the separator 32, spiral downwardly into dust bowl 33, and return to regenerator 10 via dipleg 34. The substantially solid-free gas passes upwardly through the gas outlet or lower end 74 of gas outlet tube 35 and is discharged through the upper end 76 into plenum 36.

It has been unexpectedly found that, particularly in the case of the last stage cyclone separator 32, or if more than two stages are used, at least the last stage, if certain new parameters with regard to the geometry of the cyclone separator are adhered to, enhanced efficiency, reduced wear due to erosion, and reduced erosion of the solids result. Thus, for example, the gas inlet, as for example, last stage inlet 54, may have a cross-sectional area "I" which is sufficient to help provide a gas inlet velocity of substantially 80 ft/sec (24 m./sec.), and preferably a gas inlet velocity within the range of from about 52 feet/sec. (16 m./sec.) to about 80 ft/sec. (24 m./sec.). Additionally, the gas outlet tube 35 or its end 74 may have a cross-sectional area "O" designed to help provide a gas outlet velocity of substantially 178 ft/sec (54 m./sec.). Also to achieve optimum efficiency and maximum reduction in wear due to erosion, certain relationships between the cross-sectional areas "O" and "I" should be maintained. Thus it has been found that the ratio O/I should be in the range of from about 0.4/1 to about 1/1, and preferably a range of from about 0.45/1 to about 0.6/1. Further the cyclone separator of the present invention should be designed such that the ratio of the distance, shown as L, between the lower end of outlet tube 35 or gas outlet 74 and the upper end of dipleg conduit 34 or solids outlet 70 to the internal diameter, shown as D, of the barrel portion 56 of cyclone separator 32 be such as to satisfy the equation:

$$L/D = 4.49 - 1.09 \, (O/I) \qquad \text{(Equation 1)}$$

Most preferably, for minimizing erosion of the cyclone internals by impinging catalyst, the ratio L/D is about 4.0. Cyclone separators designed in accordance with the above critical parameters exhibit maximum efficiency and minimum wear due to erosion of both the cyclone separator internal wall surface and of the separated solids.

Another and very important novel feature and unexpected result of a cyclone separator built with an L/D as defined in the formula above is a radical decrease in the production of 0–40 micron catalyst in the total circulating catalyst system or fluidized bed is reduced from about 12% down to about 5%. Thus, much less catalyst was ground up and lost or eroded into "fines" and less erosion of the separator walls resulted with the use of a cyclone separator built to the above specifications. Further, the L/D ratio is very important and critical for the following additional reasons:

1. A minimum of erosion of the mouth or inlet 70 of the dipleg or dipleg inlet is an important objective for providing great savings in dipleg replacement. It must be noted that with an increase in velocity of the dipleg inlet, the detrimental effect of erosion increases to the exponent 3 to 5 power of velocity, i.e., a small increase in dipleg inlet velocity results in a substantially large change in erosion, one numbering the new velocity raised to the 3 to 5 power.

2. The shorter the distance that L is, the less time is provided for separation of the solids from the gas. The larger the distance that L is, the greater the area of contact between outer vortex adjacent the circular wall spiraling down into the dipleg entrance and the inner vortex spiraling up into the inlet 74 of the gas outlet tube 35 causing greater leakage of solids from the outer vortex to the inner vortex.

3. The above L/D ratio provides a maximum efficiency with a minimal of erosion with the velocity of incoming mixture of gas and solids being substantially at 80 ft./sec. (24 m/s). As seen above, with a velocity greater than 80 ft./sec., the result is excessive erosion of both the separator walls and of the catalyst. With a velocity less than 80 ft./sec., the result is excess inefficiency of separation. In other words, the above L/D ratio provides maximum efficiency with minimum erosion.

In addition to the above parameters, it has also been found desirable that the diameter of the upper end of the dipleg conduit 34 or solids outlet 70 be from about 0.05 D to about 0.2 D for providing a maximum efficiency with a minimum of erosion of both the cyclone separator internal wall surface and of the separated solids. Additionally, and as pointed out above, in cases where a dust bowl such as 33 is employed it is necessary that the apex of the projection of the lower conical portion of the cyclone separator lie in or below a plane passing substantially through the junction of the barrel section 64 and the conical section 66 of the dust bowl. Thus, the lower end of the dust bowl tapers down to the same diameter of the dipleg upper end 70, and the dust bowl 33 thus forms a lower part of the conical separator 32.

Further, it is preferable that the diameter of the dust bowl 33 is between about 0.2 to 0.8 times the diameter D of the upper cylindrical portion of the cyclone 56. It has been found that when a cyclone separator constructed within the foregoing parameters and adhering to the L/D O/I relationship given in the aforementioned Equation 1, then a cyclone will be produced that has significantly less erosion and less attrition of the catalyst than a cyclone separator that is constructed not adhering to the aforementioned parameters and equations.

As used herein, the term "diameter" refers to the internal diameter. It will be understood that, generally speaking, the cyclone separator of the present invention will be disposed in a generally vertical position. However, it is within the scope of the invention for the cyclone separators of the present invention to be disposed off-vertical.

The invention of the new method for removing entrained solids from gases may be embodied in other specific forms without departing from the spirit or essential characteristics thereof. The present embodiments used to carry out the new method are therefore to be considered in all respects as illustrative and not restrictive, the scope of the invention being indicated by the appended claims rather than by the foregoing description, and all changes which would come within the meaning and range of the equivalence of the claims are therefore intended to be embraced therein.

We claim:

1. A method for removal of entrained solids from gases in an upright cyclone separator (33, FIG. 2) comprising an upper cylindrical portion having a diameter D, and a lower conical portion, said upper cylindrical portion having an inlet (54) with a cross-sectional area (I), and an outlet (74) with a cross-sectional area (O), a dust bowl (33) connected to said cyclone lower conical portion having a barrel section (64) and a conical section (66) connected thereto at a junction, said cyclone lower conical portion having an apex passing substantially to or below said junction, and a dipleg (34) attached to the conical section of the dust bowl comprising the steps, (a) injecting the gases with entrained solids in the inlet (54) of the cyclone separator in the range of substantially 52 feet per second to 80 feet per second,
   (b) spinning the injected gases with the entrained solids around and down the cyclone separator to a vertical distance (L) comprising the distance between the gas outlet (74) and the inlet (70) of the dipleg, whereby L/D=about 4, and
   (c) ejecting the solids-free-gases through the gas outlet (74) in the range of substantially 52 feet per second to 200 feet per second, whereby the range of O/I=0.4/1 to 1/1 for providing a maximum efficiency with minimum erosion of both the cyclone separator internal wall surface and of the separated solids.

2. A method as recited in claim 1 wherein the first method step comprises further,
   (a) injecting the gases with the entrained solids into the cyclone separator inlet (54) at a velocity of substantially 80 feet per second.

3. A method as recited in claim 1 wherein the third method step comprises further,
   (a) ejecting the solids-free-gases into a gas outlet (74) in the upper portion of the separator housing shaped for receiving the solids-free-gas at a velocity of substantially 178 feet per second for providing maximum efficiency with minimum erosion of both the cyclone separator internal wall surface and of the separated solids.

4. A method as recited in claim 1 wherein the third method step comprises further,
   (a) ejecting the solids-free-gases through the gas outlet having an area (O) in proportion to the separator inlet area (I) in the range of substantially O/I=0.45/1 to 0.6/1 for providing maximum efficiency with minimum erosion of both the cyclone separator internal wall surface and of the separated solids.

5. A method as recited in claim 1 wherein the second method step comprises further,
   (a) spinning the injected gases with the entrained solids around and down the cyclone separator to the dipleg inlet (70) having a diameter substantially in the range of 0.05 D to 0.2 D for providing maximum efficiency with minimum erosion of both the cyclone separator internal wall surface and of the separated solids.

6. A method as recited in claim 1 wherein the second method step comprises further,
   (a) spinning the injected gases with the entrained solids around and down the cyclone separator to the dipleg inlet by a distance (L) below the gas outlet proportional to the separator maximum diameter (D) by an amount of substantially L/D=4 for providing maximum efficiency with minimum erosion of both the cyclone separator internal wall surface and of the separated solids.

7. A method as recited in claim 1 wherein the second method step comprises further,
   (a) spinning the injected gases with the entrained solids around and down the cyclone separator to the dipleg inlet by a vertical distance (L) below the gas outlet proportional to the separator maximum diameter (D) of the separator top by an amount of substantially L/D=4.49−1.09 (O/I) for providing maximum efficiency with minimum erosion of both the cyclone separator internal wall surface and of the separated solids.

* * * * *